United States Patent [19]

Clark

[11] 4,227,173

[45] Oct. 7, 1980

[54] DIESEL FUEL MONITOR SYSTEM

[76] Inventor: Joseph H. Clark, 4015 Woodley Rd., Ellicott City, Md. 21043

[21] Appl. No.: 10,732

[22] Filed: Feb. 9, 1979

[51] Int. Cl.² ............................................. G08B 21/00
[52] U.S. Cl. ...................................... 340/59; 340/620
[58] Field of Search ..................... 340/52 R, 52 F, 59, 340/618, 619, 612, 620

[56] References Cited

U.S. PATENT DOCUMENTS

| | | | |
|---|---|---|---|
| 3,626,367 | 12/1971 | Howard | 340/52 F |
| 3,839,701 | 10/1974 | Pomerantz | 340/52 F |

*Primary Examiner*—Alvin H. Waring
*Attorney, Agent, or Firm*—Walter G. Finch

[57] ABSTRACT

An improved diesel fuel monitor system that determines a specified level of water trapped in a component of the system and disposes of said water, said water having been separated from the fuel being pumped in the engine fuel line hookup. The system consists of a device to monitor the accumulated water level as it rises in the device, said device also being the means for separating said water from said fuel and for disposing of said water, said system includes an electrical wiring circuit, connected to engine run circuit, to operate said device, a set of logic circuits as part of said electrical wiring circuit, and a combined visual and audio monitor console to record status current status of operation of said system.

11 Claims, 9 Drawing Figures

# DIESEL FUEL MONITOR SYSTEM

BACKGROUND AND SUMMARY OF THE INVENTION

The invention relates to fuel systems and particularly to diesel fuel systems, specifically to systems which separate, monitor, and dispose of water in such diesel fuel systems. More specifically, the invention relates to diesel fuel systems for diesel engines in trucks, busses, boats, construction equipment, and all other uses of diesel engines, both mobile and stationary.

Water accumulates in diesel fuel storage tanks as well as in diesel fuel operating tanks on trucks, busses, boats, construction equipment, and all other uses of diesel engines, both in mobile uses and stationary uses. The water accumulates from rain that leaks into the tanks, ground seepage into tanks, condensation in tanks from moist air, and from other similar causes. It is to be noted that diesel fuel is specified herein, but any type automotive engine fuel is included within the scope and intent of this invention.

When sufficient water reaches the engine parts that are critical in the engine operation the engine stops. In addition, in cold weather in winter or in areas that are habitually cold, the water in these critical engine parts, particularly in the engine mechanisms, such as the injector, the water freezes and prolongs the down-time of the engine. In these latter cases the mechanisms are often damaged by cracking or breaking the parts.

In regard to the above, it is important in completing the mission of the engine that it continue to operate, or be able to operate at a moments notice. Such completion of a mission might be the reaching of a destination by a truck or bus, reaching of a port by a boat or ship, keeping an emergency generating system generating electricity, the ability of an engine to start on command in a hostile environment, and other such situations.

The system of this invention is normally intended for inserting in the fuel line between the fuel pump of the system and the primary filter of the system. The system can be inserted after a regular mechanically operated pump or after an electrically operated pump.

It should be understood that a pump operated by other means, or a system inserted before a pump instead of after the pump, where the pump is capable of draining through the system, are within the scope and intent of this invention.

Included in the system is a sensing unit in a device of the system that senses the level of the water which has been trapped in device and disposes of it.

A test system can be set up to test the invented system by having both a water line and diesel fuel line connected from a water supply and a diesel fuel supply, respectively, to a pump which delivers water and/or diesel fuel to the inlet of the invented system. Valves in each of the two supply lines (water and diesel fuel supply lines) permit selectively controlling a supply of water and/or diesel fuel to the pump. Thus a supply of water and/or diesel fuel may be varied in a zero quantity of either or any percentage of either to make up a 100% total of the mixture supplied 1% and 99%, 50% and 50%, 99% and 1%, and other combinations.

In the system an alternating current (AC) is used across the terminals of the sensing unit instead of a direct current (DC). The reason AC is used instead of DC is because a DC flow of electrical energy will very quickly build up a deposit of insulating matter on one of the two terminals, whereas the use of an AC current keeps the terminals clean. The buildup of insulating matter on one of the two terminals by the direct current in due time, a relatively short time, soon stops the operation of the system. The use of an alternating current prevents such a problem by keeping both terminals of the sensing unit uncontaminated.

The AC is provided by a transformer in a set of logic circuits of the system.

The system can be set up to operate in a 12 volt or a 24 volt system, or modified for any other type voltage system. The device involved is essentially the same in either case.

The important feature of this system is that it disposes of the water at frequent intervals as the monitor senses the level at a critical point for disposal and automatically disposes it. Previously, in the prior art, the engine would stop and the water had to be drained manually from the low-point where it was accumulated.

It is to be noted that water has been specified as the contaminate, but it is to be understood that any electrically conductive contaminate is within the scope and intent of this invention.

This system does not replace the normal fuel filter, the system is inserted ahead of the filter.

It is, therefore, an object of this invention to provide a diesel fuel monitor system for diesel fuel to the water content therein.

It is another object of this invention to provide a diesel fuel monitor system that automatically disposes of water separated from the diesel fuel.

It is still another object of this invention to provide a diesel fuel monitor system operates a sensing system that operates on alternating current to keep the sensing terminals clean of insulating contaminating matter.

It is yet another object of this invention to provide a diesel fuel monitor system that has visual and audible alarm components that provides the status of system in operation.

Further objects and advantages of the invention will become more apparent in the light of the following description of the preferred embodiments.

DESCRIPTION OF THE PREFERRED EMBODIMENTS

Figure 9:
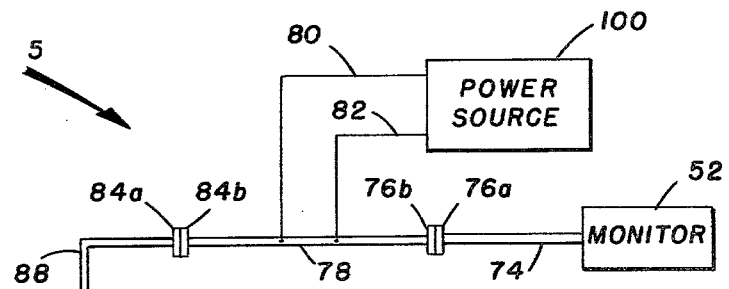
FIG. 9 is a schematic diagram of a layout of the components of a diesel fuel monitor system.
Figure 9:
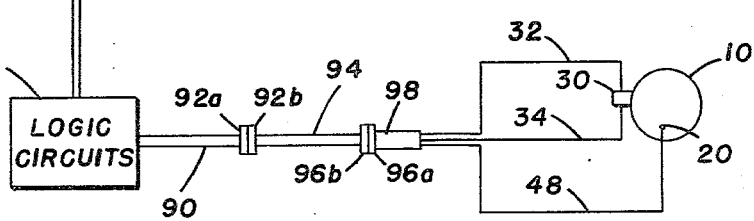

Referring to the drawings and particularly to FIG. 9, a diesel fuel monitor system is shown a 5.

Figure 1:
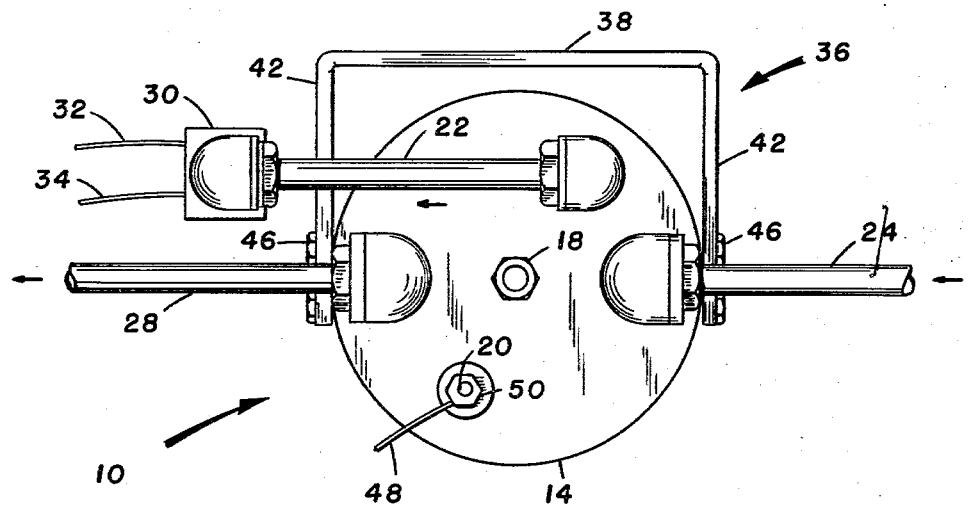
FIG. 1 is a top plan view of a water separating and disposal device of a diesel fuel monitor system.
Figure 2:
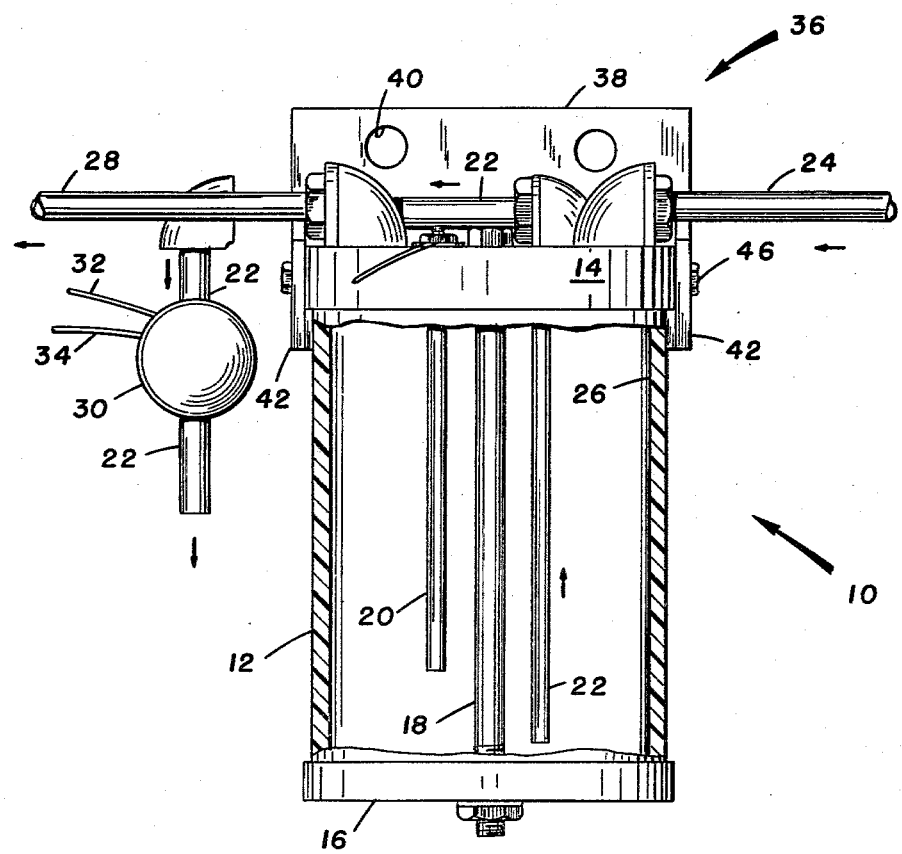
FIG. 2 is a side view in partial section of FIG. 1.

In FIGS. 1 and 2, the water separating and disposal device of a diesel fuel monitor system is shown at 10.

Referring to FIG. 9, the major components which make up the diesel fuel monitor system 5 are: the water separating and disposal device 10; a logics circuitry unit 86; a control console monitor 52; an electrical harness 94 to connect the water separating and disposal device 10 to the logics circuitry unit 86; and an electrical harness 78 to connect the logics circuitry unit 86 to the control console monitor 52, and with further connections of the diesel fuel monitor system 5 to the power source 100 of the engine run circuit that includes the fuel pump of the engine run circuit. Details of the aforementioned major components will be described hereinafter.

Turning now to the water separating and disposal device 10 shown in FIGS. 1 and 2, the diesel fuel, hereinafter called fuel, from the fuel pump (not shown) enters the water separating and disposal device 10 through inlet 24 and exits the water separating and disposal device 10 through outlet 28. As the fuel enters inlet 24 it may be contaminated with water. As the fuel leaves outlet 28 it is relatively uncontaminated with water.

Figure 7:
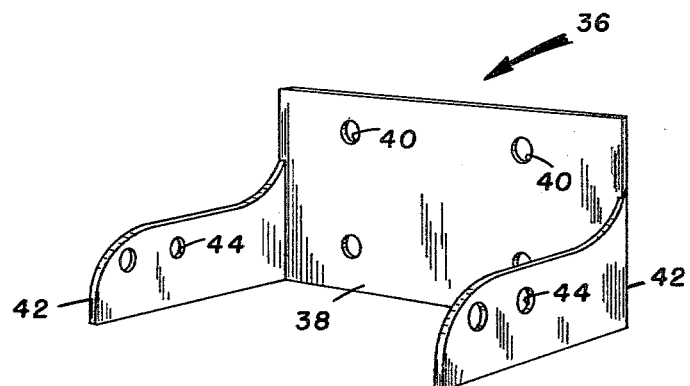
FIG. 7 is a perspective view a reversible mounting bracket for mounting a water separating and disposal device of a diesel fuel monitor system.

The water separating and disposal device 10 is mounted to a suitable support by a reversible mounting bracket 36, which is shown in detail in FIG. 7. As shown in FIGS. 1 and 2, the bracket 36 is shown on a first side of the water separating and disposal device 10 hereinafter called device 10, mounted to the device 10 by the two side arms 42 by means of bolts or machine screws 46 through holes 44 in the side arms 42 and into the top 14 of the device 10. Depending on the location of a selected place for mounting the device 10 and the arrangement of piping and other aspects of the layout, the bracket 36 may be mounted on a second side of device 10 which is opposite to the said first side of device 10. This reversal of position of the bracket 36 might also be referred to as right and left handed mounting. The suitable support to which device 10 is mounted by bracket 36 may be on the engine proper or on an associated structure, such as a truck body, boat bulkhead, or other similar and convenient support. The bracket 36 is mounted to the aforementioned support (not shown) by screws, bolts, or other suitable means (not shown) through holes 40 in the back 38 of bracket 36.

As the fuel enters the inlet 24, it flows downward through the elbow connection (not numbered) on the inlet 24 into the interior of the housing 12 of the device 10. The fuel then flows more or less horizontally across the interior 26 of the housing 12, and then generally upward and out through the elbow connection (not numbered) leading to the outlet 28.

Any water in the fuel as it enters the interior of the housing 12, falls to the bottom of the interior 26 of housing 12 and accumulates on the bottom 16 of the device 10.

The housing 12 may be glass, metal, plastics or any other similar and equivalent material. Metal has the disadvantage that the contents cannot be readily observed, whereas a clear glass or transparent plastics affords excellent opportunity for observing the fuel oil passing through the device 10 and the water accumulated in the housing 12.

The top 14, housing 12, and bottom 16 of device 10 are clamped together and held securely in place by a connecting bolt and nut 18 with suitable gaskets (not shown) to prevent leakage of oil and/or water from the interior 26 of the housing 12 with the top 14 and bottom 16 clamped in place by the connecting bolt and nut 18.

It is to be noted that the top 14 and the bottom 16 may be gasketed screw-type parts to connect to the housing 12 instead of by bolt and unit 18. Such a variation is within the scope and intent of this invention.

A small valve or petcock (not shown) may be installed in the bottom 16 in order to drain accumulated water in cold weather, when the engine is not in operation, and it is necessary to prevent freezing when the engine is idle. That is, water that may not be sufficient to initiate the disposal action of the device 10 before the engine is shut down.

When water accumulates in the lower portion of the housing 12 up to a level that the water reaches the electrode 20, which is spaced from the bottom 16, a circuit is completed through the water from the electrode 20 to either or both the bolt 18 or the discharge pipe 22.

The electrode 20 is insulated under the nut 50 from the top 14. The insulator (not numbered) is shown in FIGS. 1 and 2 under the nut 50 and it extends into the top 14 to provide the insulation.

The bolt 18 and the discharge pipe 22 have a direct connection to the top 14 and through the top 14 and bracket 36 are suitably grounded by the mounting structure.

The electrode 20, insulated from the top 14 is electrically connected to a power source through the electrical lead 48. The electrical lead 48 is incorporated into the wiring of the pigtail electrical harness 98 shown in FIG. 9.

Thus the electrical circuit at the detection of water in the housing 12 is completed through the electrical lead 48 from the pigtail electrical harness 98 to the electrode 20 through the accumulated water in the housing 20, which has reached the electrode 20, to either or both the grounded bolt 18 and/or the grounded discharge pipe 22. The discharge pipe 22 is spaced from the bottom 16 a lesser distance than the electrode 20 is spaced from the bottom 16.

When the electrical circuit is completed through the accumulated water as aforementioned, a signal is sent through the wiring system, lead 48 through the pigtail electrical harness 98, through the electrical harness 94, and through the pigtail electrical harness 90 to the logic circuits 86. The logic circuits 86 relay a signal back through the aforesaid electrical harnesses 90, 94, and 98 and thence through lead wire 32 to the solenoid valve 30, which opens the valve. The circuit being completed therefrom through ground wire 34 via the reference harnesses.

When the solenoid valve 30 opens, the fuel and accumulated water in housing 12, being under pressure by the fuel pump operation, is forced up the vertical discharge pipe 22 within the housing 12, then through the horizontal portion of discharge pipe 22, shown in FIGS. 1 and 2 on the exterior of the top 14, and then vertically downward through the exterior discharge pipe 22, through the open solenoid valve, and is discharged to a suitable receiving means (not shown) for later disposal under proper environmental conditions.

When a sufficient amount of accumulated water is discharged to lower the level of the water below the electrode 20, the circuit is broken and the solenoid valve is closed.

As aforementioned the water detection circuit is powered by an alternating current (AC). The AC is obtained from a transformer in the logic circuits 86, the AC being routed to the electrode 20 via the aforementioned electrical harnesses 90, 94, and 98.

Direction of flow into the fuel inlet 24 and out of the outlet 28 is shown by arrows in FIGS. 1 and 2. In a like manner, the direction of flow of the discharged water is shown by arrows at the discharge pipe 22 in FIGS. 1 and 2.

At the same time as the logic circuits 86 signal the solenoid valve 30 to open, a signal is also sent via pigtail electrical harness 88, through electrical harness 78, through pigtail electrical harness 74, to the control console monitor 52, to light the red alarm or visual indicator lamp 60 to notify the operator that the device 10 is operating to discharge accumulated water. Concurrently, an audible alarm or indicator 62 is sounded when the discharge of accumulated water is taking place. A switch is on the front panel of the control console monitor 52 may be used to turn of the sounding audible alarm. The operations of the control console monitor 52 is, in effect, a readout means to indicate the status of the fuel monitoring system.

The front panel of the control console monitor 52 also has a fuse 56 to protect the circuitry, a green operating light 54 to indicate when the circuits are alive and operational. It indicates when power is on and when operation can be checked. A push button 58 is available to test the circuits and the discharge operation. The push button overrides the circuit through the water and permits manually controlled operation of the solenoid valve, to test/check the operation and to discharge accumulated water in the housing 12, when there is insufficient water to automatically operate the solenoid valve.

Figure 3:
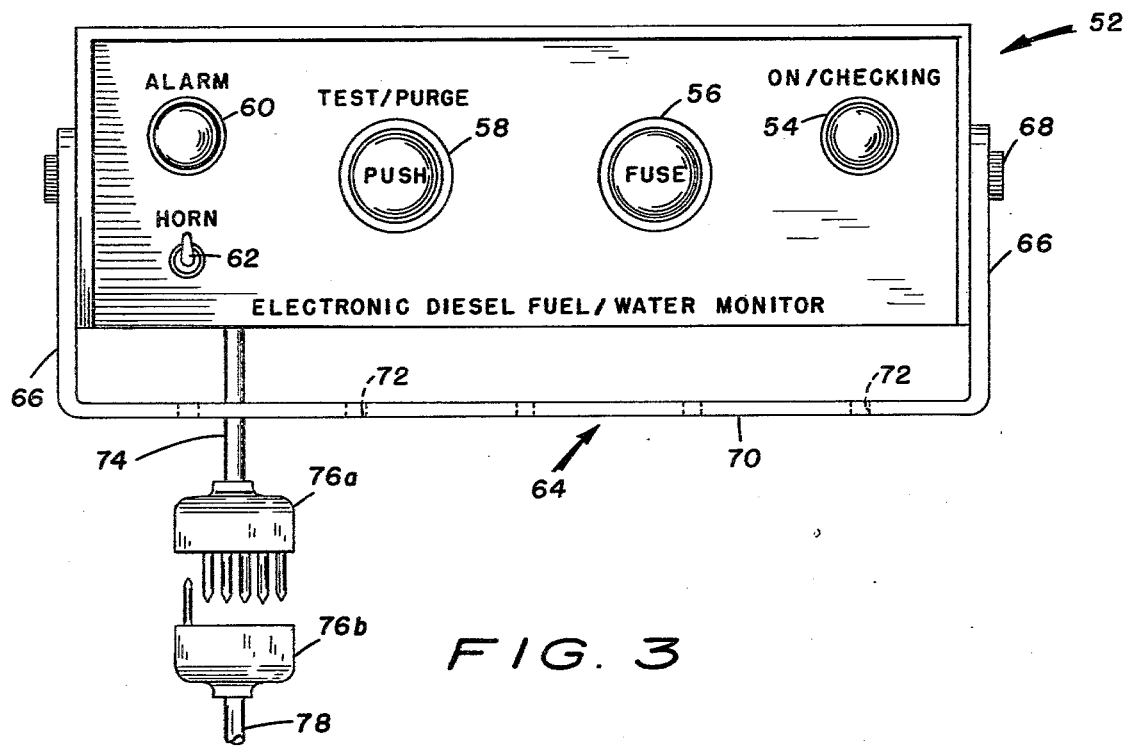
FIG. 3 is a front view of a control console monitor of a diesel fuel monitor system.
Figure 4:
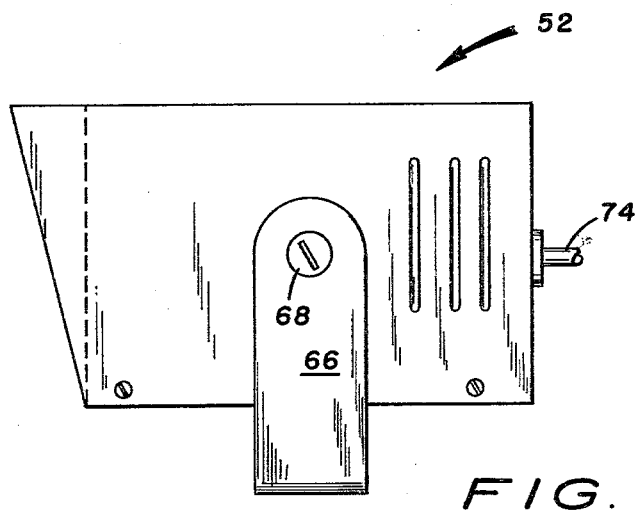
FIG. 4 is an end view of FIG. 3.

The control console monitor 52 has a mounting bracket 64 attached to it that is more or less "U" shaped. The sides 66 of the bracket 64 are arranged so that a pin, stud, or bolt 68 is inserted through the end areas of the bracket 64 to attach or affix it pivotably to the control console monitor 52 so that the console 52 may be positioned in a plurality of positions for viewing. The bracket 64 may also thus be pivotably arranged to be at the bottom side of the control console monitor 52, as shown in FIGS. 3 and 4, or pivotably arranged to be on the top side or rear side of the control console monitor 52.

When the bracket 64 is at the bottom lid of the control console monitor 52, as hereinbefore mentioned, it can be mounted on a suitable top surface, such as a dash board top side or similar shelf-like surface. When the bracket 64 is at the top side of the control console monitor 52, as hereinbefore mentioned, it can be mounted on a suitable underside surface, such as under a dash board or similar over-hang area. Being pivotably attached, the bracket 64 can also be arranged toward the back of the control console monitor 52, as hereinbefore mentioned, and mounted on a wall or other vertical surface as might be available in stationary type installations.

The "U" shaped bracket 64 has holes 72 in the bottom portion 70 of the "U" for suitable mounting means to attach it to a surface as hereinbefore described.

The control console monitor 52 has a pigtail electrical harness 74 extending from it for connecting it to the electrical harness 78 as shown in FIG. 9.

The logic circuits 86 are contained in a separate unit which may be suitably mounted in and on a vehicle, boat, location of a stationary engine, or similar condition. The logic circuits 86 have two pigtail electrical harnesses 88 and 90 extending therefrom. The pigtail electrical harness 88 is connected to the electrical harness 78 and the pigtail electrical harness 90 is attached to the electrical harness 94 all as shown in FIG. 9.

Figure 5:
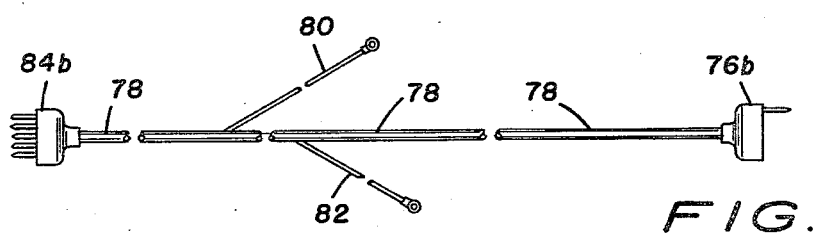
FIG. 5 is a top plan view of an electrical wiring harness for connecting a logic circuits component to a control console monitor component of a diesel fuel monitor system.
Figure 6:
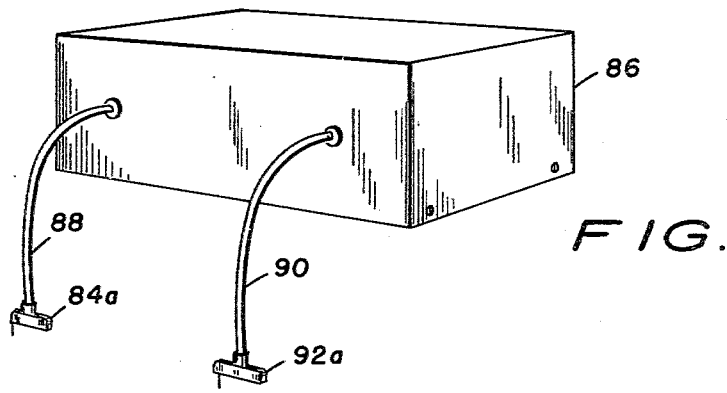
FIG. 6 is a perspective view of a case containing logic circuits of a diesel fuel monitor system.
Figure 8:
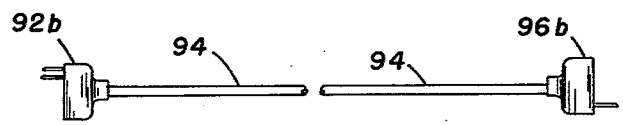
FIG. 8 is a top plan view of an electrical wiring harness for connecting a logic circuits component to the electrical connections of a water separating and disposal device of a diesel fuel monitor system.

The electrical harnesses aforementioned all have mating electrical plug connectors for making the electrical connections as hereinbefore described. Those mating electrical plug connectors are: pigtail electrical harness 74 on the control console monitor 52 has a plug connector 76a to mate with the plug connector 76b on electrical harness 78, as shown in FIGS. 3, 5, and 9; pigtail electrical harness 88 on the logic circuits 86 has plug connector 84a to mate with plug connector 84b on electrical harness 78, as shown in FIGS. 4, 6, and 9; pigtail electrical harness 90 on logic circuits 86 has plug connector 92a to mate with plug connector 92b on electrical harness 94, as shown in FIGS. 6, 8, and 9; and pigtail electrical harness 98 attached to the electrode 20 by lead 48 and to the solenoid valve 30 by leads 32 and 34, all said leads being from said electrical harness 98, has plug connector 96a to mate with plug connector 96b on electrical harness 94, as shown in FIGS. 8 and 9.

The electrical harness 78 also has two leads 80 and 82 extending from it to connect to the power source 100 in the engine run circuit. The power source designation 100 also includes the operation of the fuel pump, (not shown) which supplies fuel (pure or contaminated with water) from the operating fuel tank (not shown) to the inlet 24 to the device 12 as hereinbefore specified. The leads 80 and 82 extending from electrical harness 78 and connecting to the power source 100 are shown in FIGS. 5 and 9.

It is to be noted that all the aforesaid connector plugs are multi-pole to provide continuity of wiring from, to, and between the respective terminals of the structural parts and entities, as hereinbefore described and specified, so as to provide electrical wiring circuits interconnecting said structural parts and entities for electrical operation as specified.

Accordingly, modifications and variations to which the invention is susceptible may be practiced with out departing from the scope and intent of the appended claims.

What is claimed is:

1. A method for separating, detecting, and automatically disposing of an electrically conductive contaminate in the fuel of automotive type systems, comprising, passing said fuel through a separating mechanism to separate the contaminate and accumulate it at a specified point, sensing the fuel and contaminate under pressure, passing an electrical current through said contaminate between at least two terminals, to complete a circuit, the completion of said circuit causing a valve to open whereby said pressure forces the accumulated contaminate through discharge means to a point of disposal.

2. A fuel monitor system for separating, detecting, and automatically disposing of an electrically conductive contaminates in the fuel of automotive type systems, comprising:

a separating means for inserting in a fuel line of automotive type equipment to separate from and accumulate said contaminates in said fuel;

a sensing means mounted within said separating means to detect the presence of said contaminates;

a means for maintaining pressure on said fuel containing said contaminates within said separating means, connected to said fuel line;

an electrical circuit system connected to said sensing means to control the operation and to provide a charge to said sensing means;

a readout means connected to said electrical circuit system to signal the status of said fuel monitoring system; and a disposal means connected to said separating means to discharge said accumulation of said contaminates.

3. The fuel monitoring system recited in claim 2, wherein said separating means consists of a hollow cylindrical body means, open at each end, having both a top and bottom closure structure suitably sealed and attached to said body means, said top closure having openings therein for connection of an inlet means for said fuel with said contaminates, and for connection of an exit means for said fuel after contaminates are separated therefrom and accumulated within said body means, said inlet and outlet means communicating with the hollow interior of said body means through said openings in said top closure therefor.

4. The fuel monitoring system recited in claim 3, wherein said sensing means consists of an electrical conductor inserted through said top closure and insulated therefrom, said electrical conductor extending downward into hollow interior of said body means and spaced from said bottom closure, and a hollow tubular pipe means connected to top closure and passing therethrough to communicate with the exterior thereof, said hollow tubular pipe means spaced from said bottom closure a lesser distance that the spaced distance of said electrical conductor from said bottom closure.

5. The fuel monitoring system recited in claim 2, wherein said means for maintaining pressure on said fuel containing said contaminates within said separating means is the fuel pump of said automotive type system.

6. The fuel monitoring system recited in claim 4, wherein said electrical circuit system is connected to said electrical conductor of said sensing means and consists of a plurality of electrical harness means, each said electrical harness means having a mating connector plug on the end thereof that connects to a mating connector plug on an adjacent harness means, a first of said electrical harness means being a pigtail type having one end without a connector plug which end is connected to elements of said readout means, a second of said electrical harness means being a pigtail type having one end without a connector plug which end has a lead connected to said electrical conductor of said sensing means and two leads connected to said disposal means, a third of said electrical harness means being a pigtail type having one end without a connector plug which end is connected to a logic circuits structure in which one element is a transformer which provides an alternating current for said electrical conductor of said sensing system through said plurality of electrical harness means, a fourth of said electrical harness means being a pigtail type having one end without a connector plug which end is also connected said logic circuits structure, a fifth of said electrical harness means being a connection means between said first and said fourth of said electrical harness means and additionally having two separate leads therefrom connected to the power source of said automotive type system, and a sixth of said electrical harness means being a connection between said second and said third of said electrical harness means.

7. The fuel monitoring system recited in claim 2, wherein said readout means consists of a console having a visual light means to signal that system is on, a visual light system to signal operation of said disposal means, an audible alarm to signal operation of said disposal means and having a switch whereby said audible alarm can be silenced, a switch to test operation of said fuel monitoring system which concurrently purges any accumulated contaminates from said fuel monitoring system, and a fuse for protection of the electrical elements of said fuel monitoring system, said console having a pivotable mounting bracket for mounting said console in a plurality of positions for viewing after mounting.

8. The fuel monitoring system recited in claim 4, wherein said disposal means consists of said hollow tubular pipe means and additionally, a second tubular pipe means connected to the first said tubular pipe means and communicating internally therewith, a solenoid valve connected to the distal end of said second tubular pipe means and communicating therewith, and a third tubular pipe means connected to the outboard side of said solenoid valve and communicating therewith, the distal end of said third tubular pipe means being discharged into an environmentally suitable container.

9. The fuel monitoring system recited in claim 3, wherein said hollow cylindrical body means is transparent for observation of fuel and accumulated contaminates therein.

10. The fuel monitoring system recited in claim 3, wherein said separating means is mounted by a reversal type bracket which can be mounted for both left and right installation.

11. The fuel monitoring system recited in claim 3, and additionally, a petcock type valve installed in said bottom closure and communicating with the interior of said hollow cylindrical body means.

* * * * *